(12) United States Patent
Schondorf et al.

(10) Patent No.: US 6,640,174 B2
(45) Date of Patent: Oct. 28, 2003

(54) RESTRAINT AND FUEL SYSTEM CUTOFF CONTROL MODULE

(75) Inventors: Steven Yellin Schondorf, Dearborn, MI (US); Scott Howard Gaboury, Ann Arbor, MI (US); Troy Otis Cooprider, Dexter, MI (US); Rene A. Najor, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

(21) Appl. No.: 09/773,286

(22) Filed: Jan. 31, 2001

(65) Prior Publication Data

US 2002/0103590 A1 Aug. 1, 2002

(51) Int. Cl.[7] .......................... B60R 22/00; E05F 15/00; G01M 17/00; G06F 19/00; B60K 28/00
(52) U.S. Cl. .......................... 701/45; 701/29; 180/271; 180/274; 180/279; 180/284
(58) Field of Search .............................. 701/45, 29, 48, 701/31, 35; 180/271, 274, 279, 284

(56) References Cited

U.S. PATENT DOCUMENTS

| | | | |
|---|---|---|---|
| 3,781,824 A | 12/1973 | Caiati et al. | 340/172.5 |
| 4,307,455 A | 12/1981 | Juhasz et al. | 714/24 |
| 5,056,056 A | 10/1991 | Gustin | 702/187 |
| 5,590,040 A | 12/1996 | Abe et al. | 701/35 |
| 5,797,111 A * | 8/1998 | Halasz et al. | 701/103 |
| 5,825,098 A | 10/1998 | Darby et al. | 307/10.7 |

OTHER PUBLICATIONS

English language Abstract of Japanese No. JP 100194007.

* cited by examiner

Primary Examiner—Jacques H. Louis-Jacques
Assistant Examiner—Brian J. Broadhead
(74) Attorney, Agent, or Firm—Gary A. Smith; Brooks & Kushman, PC

(57) ABSTRACT

A restraint and fuel pump cutoff control system is disclosed wherein a restraint control module controls the restraint system such as an air bag deployment system and a fuel system power supply based upon data inputs from sensors positioned at various locations on the vehicle. When data received from the sensors indicates that a collision event has occurred and has reached the predetermined level of severity, power to the fuel system is cut off to prevent undesired pumping of fuel. If power is interrupted during a collision event, the fuel system will be cut off and remain cut off until reset by turning the ignition switch to off and then to run/start indicating a clean shutdown. The restraint control module utilizes collision data profiles to distinguish between power shutdowns occurring during a collision event and power shutdowns occurring when only background data is being received from the sensors.

12 Claims, 5 Drawing Sheets

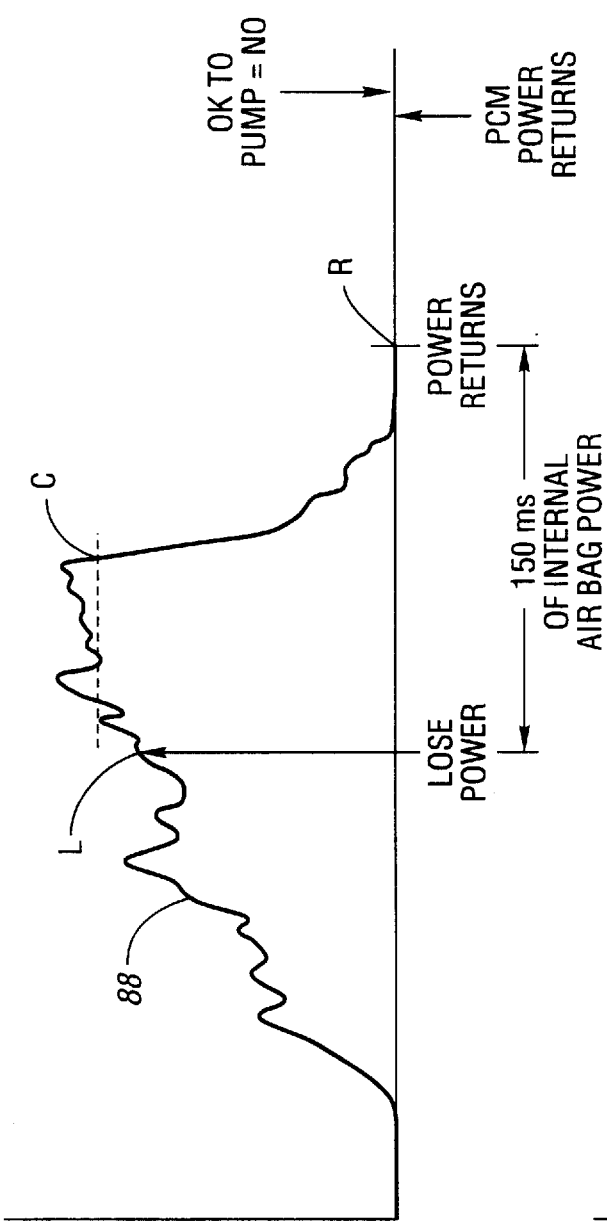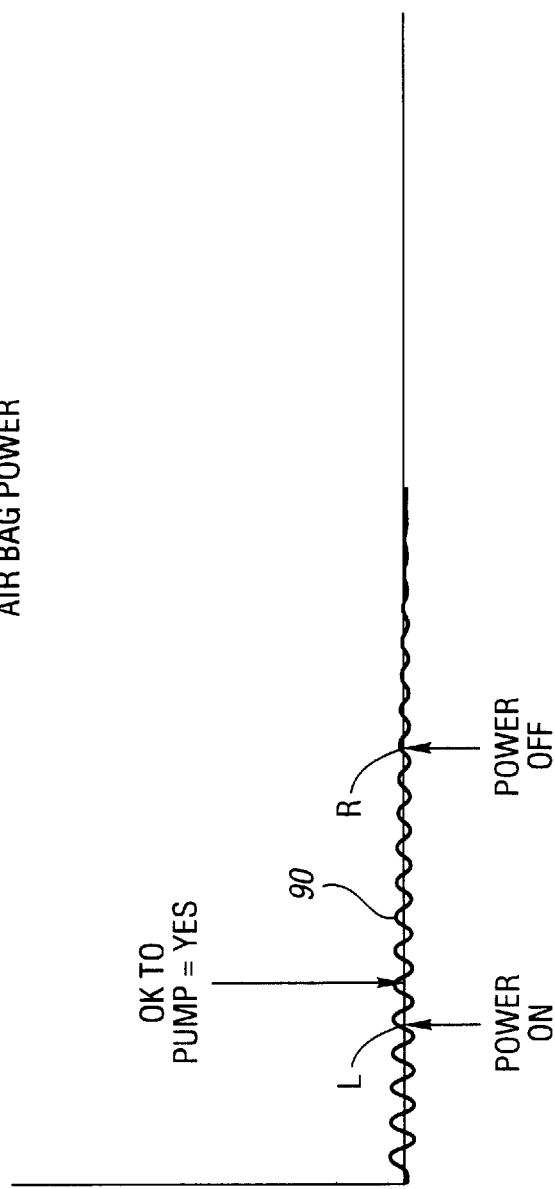

RESTRAINT AND FUEL SYSTEM CUTOFF CONTROL MODULE

BACKGROUND OF THE INVENTION

1. Field of the Invention

The present invention relates to a vehicle restraint control module having a system for monitoring power interruption and controlling a vehicle system, such as a fuel pump, in the event of a power interruption.

2. Background Art

Current vehicle designs incorporate electronic controls for many functions. Examples of vehicle electronic controls include engine controls, restraint controls, fuel system controls, and the like.

A restraint control module is used to control air bag deployment in the event of a collision. Restraint control modules are powered by the vehicle battery in either the "run" or "start" ignition switch positions. Restraint control modules may have backup power supply systems that generally include a capacitor-based backup power supply system. Backup power supply systems for restraint control modules generally have sufficient capacity to power air bag deployment and also to provide control circuit and memory protection.

Restraint control modules constantly monitor data received from sensors, such as accelerometers, radar sensors, ultrasonic sensors and the like that can provide data to the microprocessor that assist in identifying crash severity and are useful in developing safing procedures. Upon receiving data from sensors that is potentially indicative of a collision event, the restraint control module compares the data being received to stored collision data profiles to determine whether a collision has occurred. Upon receiving collision data corresponding to a collision of a predetermined magnitude, the restraint control module may be programmed to shut down other systems such as the fuel pump of the vehicle by interrupting power to the fuel pump.

Currently, a separate electromechanical fuel flow cutoff switch from the restraint control module functions to stop operation of the fuel pump upon sensing an impact. The fuel flow cutoff switch is intended to prevent fuel leakage by disabling the fuel pump. Fuel flow cutoff switches are generally located in the rear portion of a vehicle. Problems may be encountered relating to finding an acceptable location to mount the fuel flow cutoff switch. Another disadvantage of the electromechanical fuel cutoff switch is that it adds cost to the vehicle.

A manual reset button is provided on the vehicle to permit the fuel pump to be reset by a user or service technician after it is determined that it is safe to allow the fuel pump to be operated. The manual reset system requires that the reset button first be located. Information regarding the operation and location of the reset button is generally provided in a vehicle owners manual but many owners are not familiar with the reset procedure. On occasion after a minor collision that triggers the fuel flow cutoff, the vehicle may be safe to drive but is immobilized by the fuel flow cutoff switch. If the owner is unaware of the reset procedure, an unnecessary service call may be required to reset the fuel pump.

It has been proposed that the restraint control module may be used to provide a fuel cutoff switch that is controlled based upon data received from sensor inputs. One drawback of this approach is that the restraint control module cannot distinguish between a normal shutdown that occurs when the key is turned off in the ignition and a short duration power interruption that could conceivably occur during a collision event. Also, it is possible that a brief short circuit could be interpreted by the restraint control module as a power interruption. When power is supplied after a brief interruption, the restraint control module may be reset without storing data acquired during the collision event. While this would not create a problem for restraint control modules that are used solely for air bag deployment, automatic resetting may be unacceptable if the restraint control module is used to control other systems such as the fuel pump to provide a fuel cutoff mechanism.

There is a need for a restraint control module that provides a simple and effective system for cutting off power to the fuel pump when a collision event occurs that will not be automatically reset after a short duration power interruption. There is also a need for a fuel cutoff system that utilizes existing sensors and microprocessor capacity that does not require the use of a manual reset button or separate electromechanical fuel flow cutoff switch. There is also a need for a restraint control module that is effective to store data from sensors acquired during a collision event that is not reset if a power interruption occurs during the collision event.

These and other problems and needs are addressed by applicants' invention as summarized below.

SUMMARY OF THE INVENTION

According to the invention, a method of discriminating between a normal power interruption to a restraint control module and a collision induced power interruption to the restraint control module is provided. According to the method, a digital input bit is set in a microprocessor in a first state when a normal power interruption occurs. The microprocessor monitors for a power interruption to the restraint control module while the restraint control module is powered. The restraint control module monitors sensor output data based upon an algorithm programmed into the microprocessor to determine whether a collision event has occurred. Upon determination that a power interruption has occurred, the algorithm is checked to determine whether the power interruption occurred during a collision event. If so, the digital input bit is set to a second state to indicate that the power interruption occurred during a collision event. With the bit set to its second state, the restraint control module may prevent powering up of a system of the vehicle controlled by the microprocessor.

According to another aspect of the invent on, the system that is prevented from powering up may be the fuel pump of the vehicle. The invention could also be used in conjunction with electric vehicles to prevent powering up of specified components of the electric vehicle if power is interrupted during a collision event.

According to the invention, the sensors may be accelerometers that provide acceleration/deceleration data to the microprocessor. Alternatively, other sensors may be used including radar sensors, ultrasonic sensors and the like.

According to yet another aspect of the invention, the restraint control module may be used to control at least one air bag system.

According to another aspect of the method of the present invention, the microprocessor algorithm includes collision profile data that is stored in memory and compared to the sensor output data to determine if a collision event has occurred.

According to another aspect of the invention, a combined restraint control and fuel system cutoff control module is provided for a vehicle. The restraint control module is connected to a power supply when an ignition switch of the vehicle is in its on position or in its start position. The restraint control module has a microprocessor that is programmed with an algorithm that is used to detect a collision event. At least one sensor provides acceleration/deceleration data to the microprocessor. The microprocessor controls deployment of restraints such as air bags and also controls the fuel system cutoff based upon analysis by the algorithm of the acceleration/deceleration data received by the microprocessor. The microprocessor monitors whether connection of the restraint control module to the power supply has been interrupted and, if so, the microprocessor further determines whether the interruption occurred during a collision event. If it is determined that the interruption occurred during a collision event, the microprocessor enables the fuel system cutoff until the ignition switch is manipulated by an operator to reset the fuel system cutoff.

The combined restraint control and fuel system cutoff control module algorithm utilizes accelerometer output profiles to which acceleration/deceleration data from the sensor is compared to detect a collision event. Other sensors may be used in a similar manner including radar systems, ultrasonic sensors and the like.

According to another aspect of the invention, a short duration power interruption occurring during a collision event may be detected causing the fuel system to be cut off, thereby preventing operation of the fuel system until the ignition is normally turned off and then to its on or start position.

According to another aspect of the invention, the at least one sensor may comprise a plurality of accelerometers or other sensors including radar sensors, ultrasonic sensors and the like.

According to another aspect of the invention, the combined restraint control and fuel system cutoff control module microprocessor is linked to a memory storage apparatus. The memory storage apparatus stores acceleration/deceleration data when a collision event occurs for subsequent analysis until the ignition is cycled off and on.

According to yet another aspect of the invention, the combined restraint control and fuel system cutoff control module preferably includes a backup power supply for powering the restraint control and memory storage apparatus. The backup power supply is enabled only when the power supply is interrupted.

These and other aspects and advantages of the invention will be better understood upon review of the attached drawings in light of the following detailed description.

BRIEF DESCRIPTION OF THE DRAWINGS

FIG. 7 is a graph showing an accelerometer output data graph of power loss and power return following a collision event; and FIG. 8 is a graph showing a normal accelerometer output data graph of power loss and power return under normal operating conditions.

DETAILED DESCRIPTION OF THE PREFERRED EMBODIMENT(S)

Figure 1:
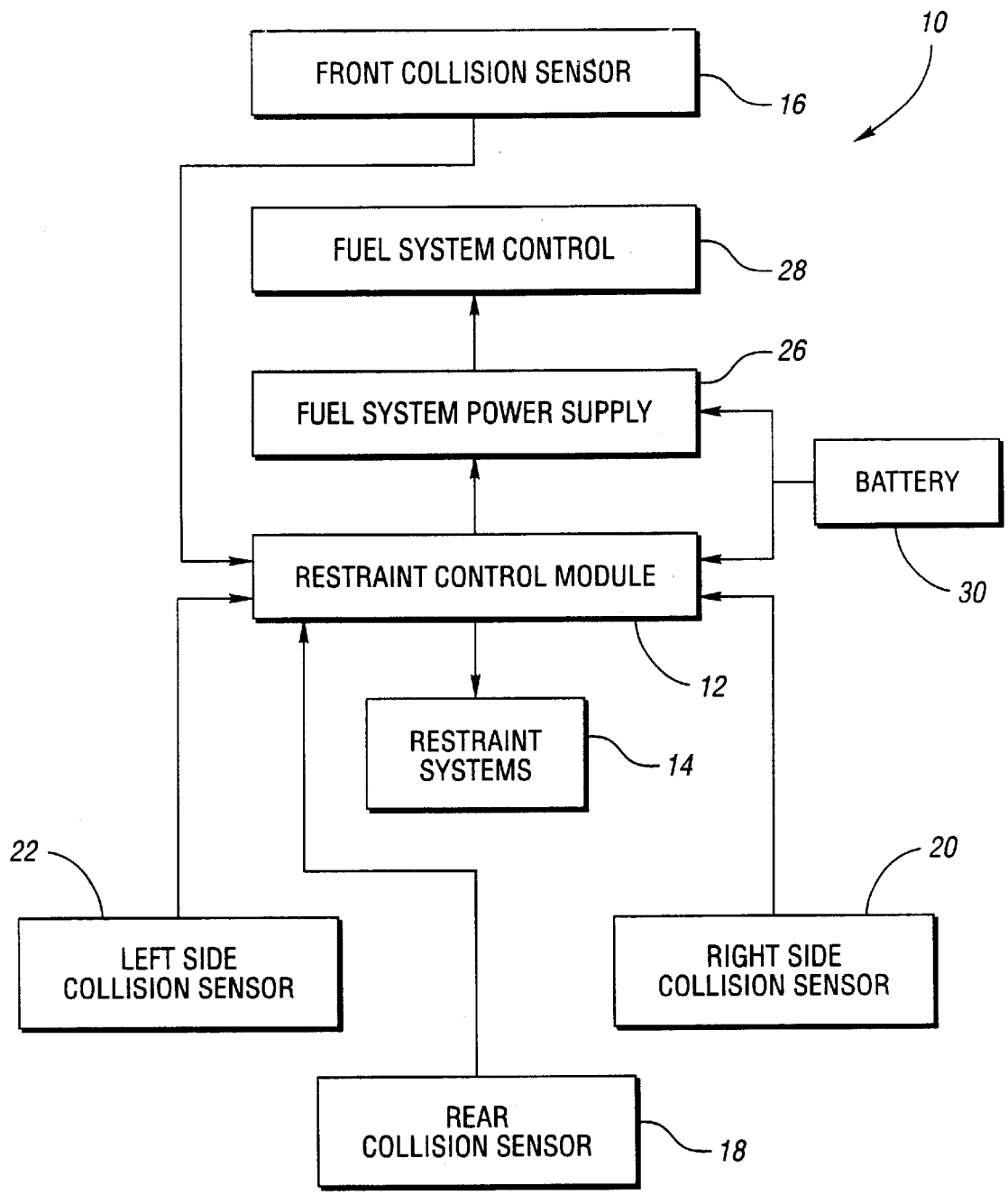
FIG. 1 is a flowchart showing a restraint control module that monitors sensors and controls a fuel system and restraint systems according to the present invention.

Referring now to FIG. 1, a restraint and fuel system cutoff control system 10 is illustrated in flowchart form. A restraint control module 12 is used to control the restraint system 14 such as an air bag deployment mechanism that is controlled by the restraint control module 12. Front collision sensor 16, rear collision sensor 18, right collision sensor 20, and left collision sensor 22 are accelerometers that provide inputs to the restraint control module 12 to detect the occurrence of a collision. Restraint control module 12 also controls a fuel system power supply 26 that provides power to the fuel system control 28. A vehicle battery 30 provides power to both the restraint control module 12 and fuel system power supply 26 under normal circumstances.

Figure 2:
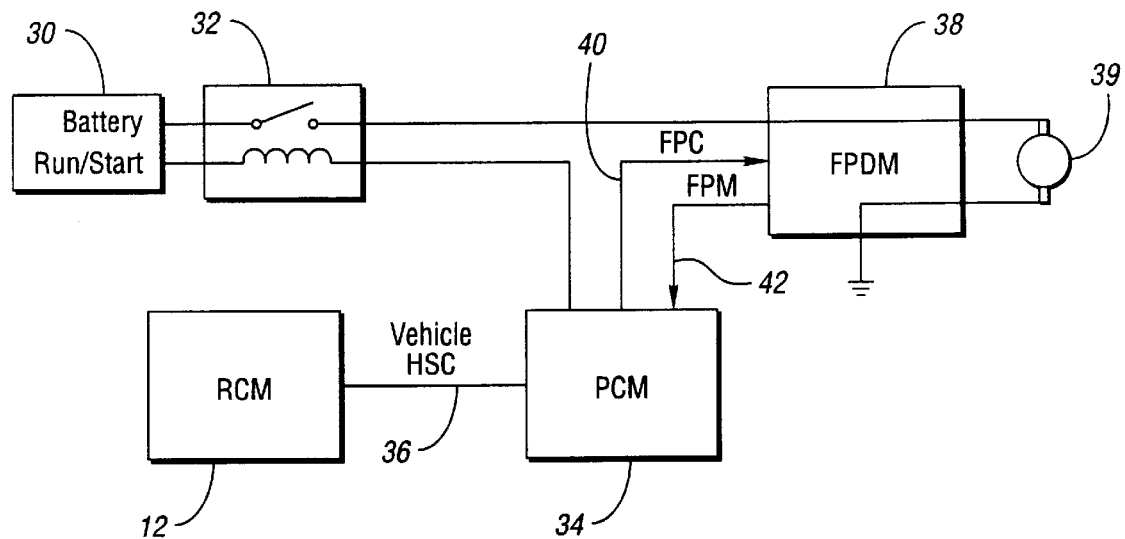
FIG. 2 is a flowchart showing the relationship of a vehicle battery, restraint control module, a fuel pump driver module, and fuel pump according to the present invention.
Figure 3:
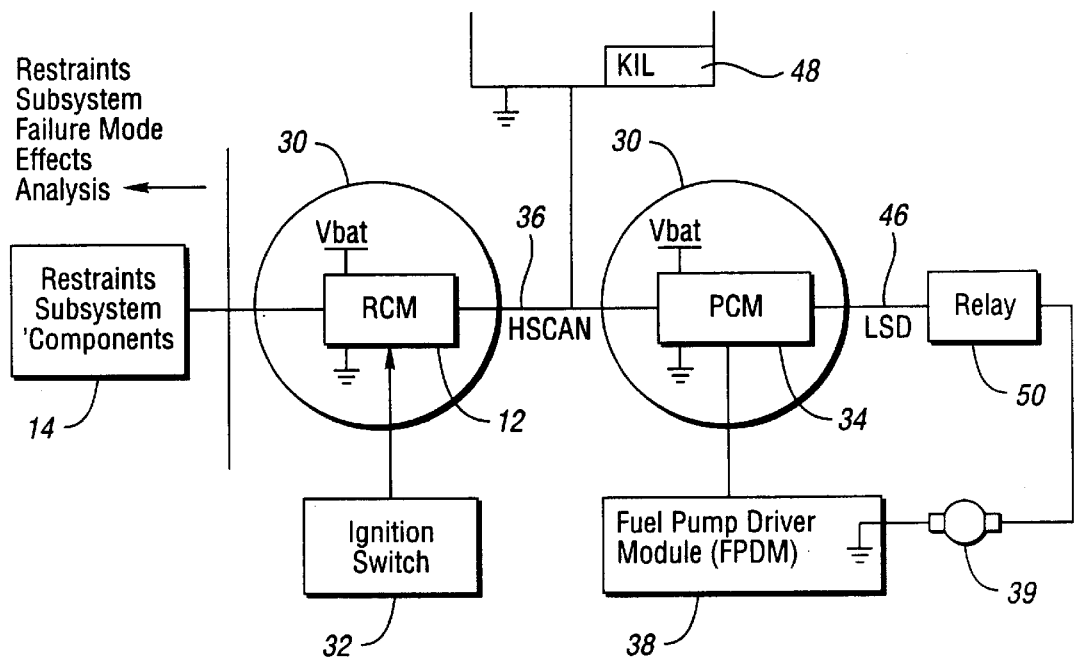
FIG. 3 is a flowchart showing the restraint control module and powertrain control module made in accordance with the invention.

Referring now to FIGS. 2 and 3, schematic drawings of the fuel subsystem are shown. The vehicle battery 30 is connected through an ignition switch 32 to the powertrain control module 34. The restraint control module 12 in the event of a collision transmits a signal to the powertrain control module 34 via a multiplexed data bus 36. The powertrain control module 34 compares a message from the restraint control module 12 to the fuel pump driver module 38 via the fuel pump monitor line and determines whether the fuel pump driver module 38 is operating or disabled. The powertrain control module may lift the low side drive 46 to latch relay 50 or modify the fuel pump control to ensure the functionality of the fuel cutoff. The fuel pump 39 is controlled by the fuel pump driver module 38 while the fuel pump monitor 42 communicates the status of the fuel pump driver module 38 to the powertrain control module 34. Referring more specifically to FIG. 3, the restraint control module 12 is enabled upon actuation of the ignition switch 32 so that it may deploy the restraint subsystem components 14. The restraint control module 12 also communicates via the multiplexed data bus 36 with the powertrain control module and with a restraints indicator light 48 upon detection of a collision event. The powertrain control module communicates via the low side drive to relay 50 that controls the fuel pump 39 in conjunction with the fuel pump driver module 38.

Figure 4:
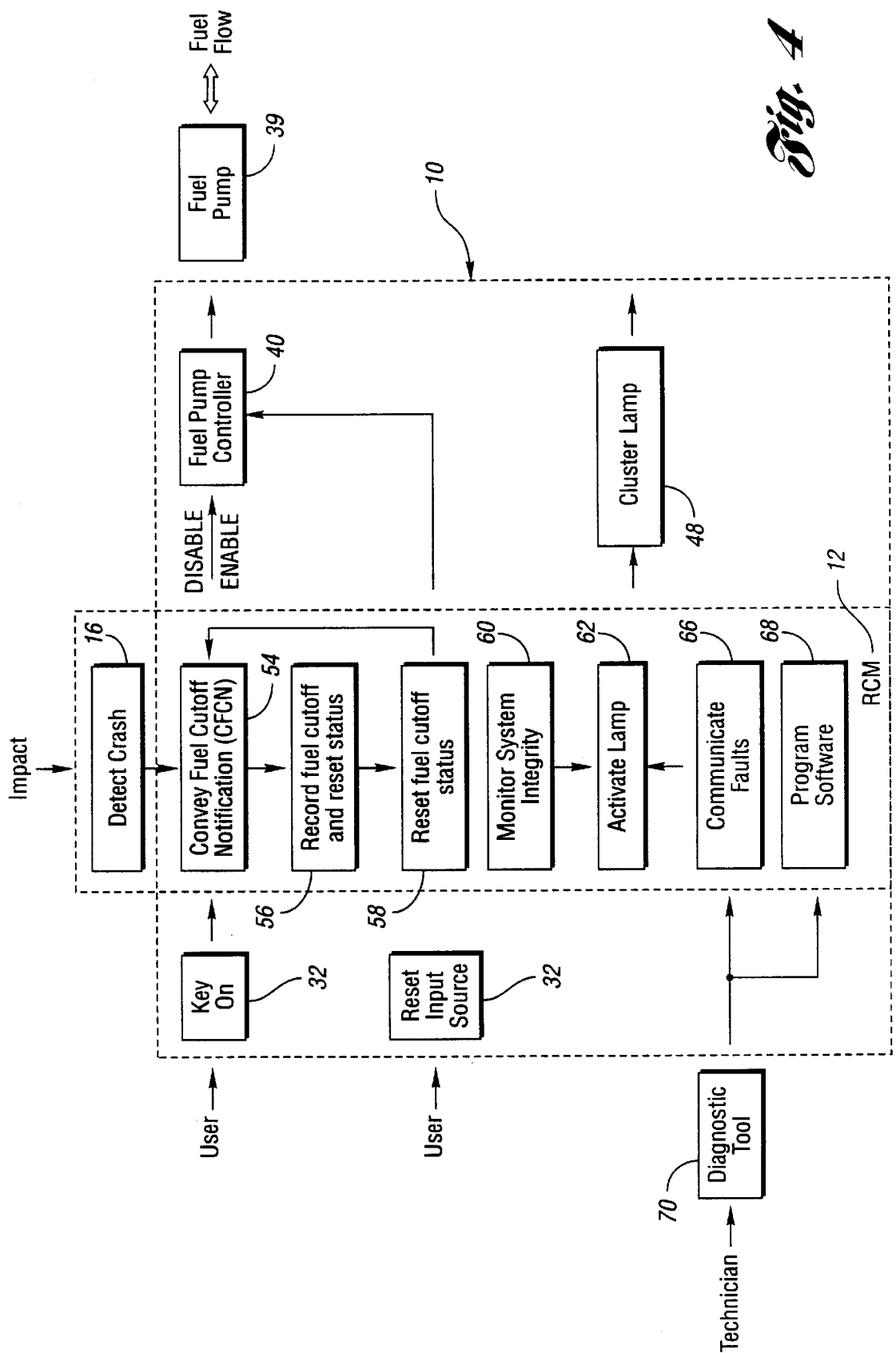
FIG. 4 is a block diagram showing the desired operation of a fuel cutoff system in conjunction with the restraint control system.

Referring now to FIG. 4, a fuel cutoff functional block diagram is shown wherein the restraint and fuel system cutoff control system 10 includes the restraint control module 12 that receives impact detection from a sensor, such as the front collision sensor 16, in the event of an impact. The system is normally activated by turning the ignition switch at 32 on. If an impact is detected at 16, the restraint control module 12 conveys fuel cutoff notification at 54 and the fuel cutoff and reset status is recorded at 56. Upon receiving the fuel cutoff notification at 54, the fuel pump controller 40 may be disabled which in turn disables the fuel pump 39. After the fuel pump 39 has been disabled, the user may reset the system by turning the ignition key off and then on to thereby reset the fuel cutoff status at 58. Reset is then communicated to the fuel cutoff notification at 54 that in turn enables the fuel pump controller 40 and allows the fuel pump 39 to permit fuel to flow to the engine. The restraint control module continually monitors system integrity at 60. Upon detection of an impact, the restraint control lamp 62 is activated which in turn activates a cluster lamp or restraints indicator light 48 to notify the driver of the restraint control module activity. The restraint control module 12 includes a fault communication function at 66 and an ability to program software at 68 when accessed by a diagnostic tool 70 operated by a service technician. The service technician using the diagnostic tool 70 may either program the software for the restraint control module or communicate faults in the system to the driver by activating the lamp system at 62 causing the restraints indicator light 48 to be illuminated to notify the driver.

Figures 5, 6:
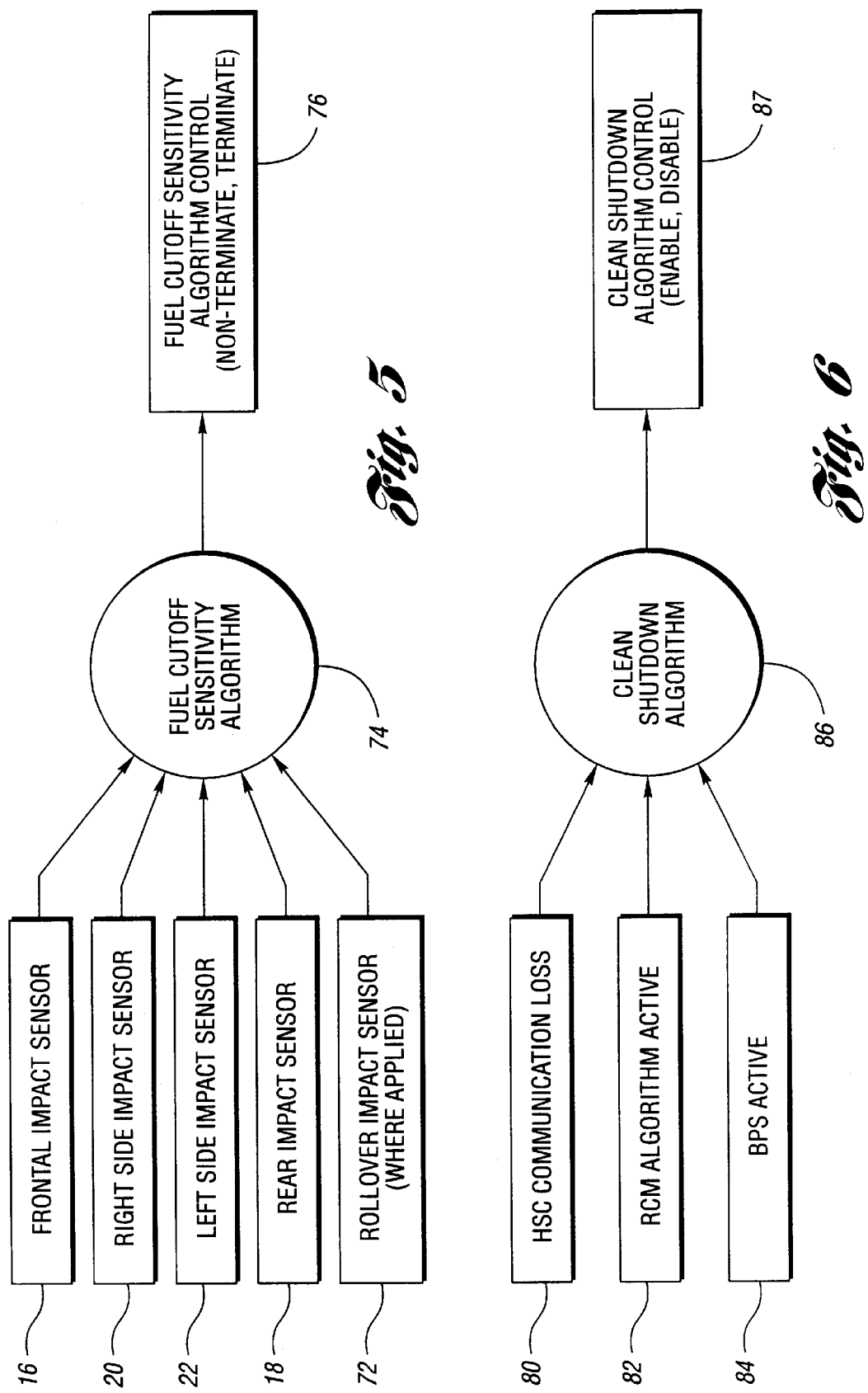
FIG. 5 is a diagram showing the inputs and outputs of a fuel cutoff severity algorithm.
FIG. 6 is a schematic representation of a clean shutdown algorithm based upon inputs received from three sources with an output to the database algorithm control.

Referring now to FIG. 5, the fuel cutoff functions to terminate fuel delivery upon sensing an impact to minimize fuel leakage. The restraint control module senses impacts by means of one of the sensors 16, 18, 20, 22 or a rollover sensor 72, if provided. The fuel cutoff severity algorithm 74 analyzes the inputs from the sensors to determine whether or not an impact is sufficiently severe to cut off fuel supply wherein the fuel cutoff impact severity algorithm control at 76 determines whether or not to cut off power to the fuel pump. The fuel cutoff severity algorithm 74 verifies that fuel deactivation is warranted and must conform to requirements for initiation of deployment of a restraint. The restraint control module utilizes data from the sensors 16 through 22 and 72 to determine whether minimum impact parameters for acceleration or deceleration have been exceeded. Sensors may also include a center impact sensor (not shown) that is internal to the restraint control module.

Referring now to FIG. 6, the restraint control module monitors for a loss of the high-speed controller area network communication, monitors to determine whether or not the restraint control module algorithm is active, and also monitors to determine whether or not the backup power supply for the restraint control module is active at 84. If the high-speed control area network communication is lost at 80, or the restraint control module algorithm is active at 82, or the backup power supply is active at 84, this information is communicated to the clean shutdown algorithm 86.

The clean shutdown algorithm communicates with the clean shutdown algorithm control if the system is shutdown normally. The system is shutdown normally by turning the ignition switch off and then to Run/Start. If a normal shutdown is performed, a digital input bit of a microprocessor is set in a first state. If there is a loss of communication via the high-speed control area network at 80, indication that the RCM algorithm is active at the time of a shutdown or the backup power supply is active at 84, the digital input bit relating to shutdown is set to a second state thereby indicating that the power interruption may have occurred during a collision event. When the digital input bit is set to the second state, the clean shutdown algorithm activates the clean shutdown algorithm control at 87 to prevent powering up of the fuel pump.

Data is recorded by the restraint control module corresponding to the fuel cutoff deployment decision data. Data is recorded even if the system is operating under the backup power supply. The restraint control module stores the powertrain control module high-speed control area network acknowledgment and status message even if the system is operating under the backup power supply.

After the fuel cutoff has been deployed, the system may be reset by cycling the ignition from off to Run/Start thereby performing a clean shutdown that enables the vehicle to restart.

The restraint control module records data relating to vehicle operation upon each power interruption. The inputs required to execute a clean shutdown strategy consist of the following inputs: detection of the powertrain control module communication loss, restraint control module performing algorithm activity, or restraint control module operating under the backup power supply. If the power interruption occurs when none of the above inputs are detected, a clean shutdown is indicated. In the event that any of the inputs is present, the restraint control module transmits a deployment of the fuel cutoff to stop operation of the fuel pump.

Referring now to FIG. 7, a trace of data indicating a collision event is shown at 88. Upon reaching a predetermined degree of activity indicated by dashed line C, the restraint control module will cut off power to the fuel pump. If during a collision event there is a loss of power, for example at L in FIG. 7, the restraint control module stores the data input bit indicating that the restraint control module was active at the time power was lost. If power later returns at R after the collision event has ceased, the restraint control module crash algorithm was active and continues to prevent the fuel system control from being reactivated.

Referring now to FIG. 8, a background data profile 90 is shown to indicate the expected data profile that is generated upon normal car operation. Low amplitude inputs from the sensors are recorded. If there is a power interruption at L while the background data profile 90 is being experienced, the system will determine that the power shutdown was a clean shutdown and there will be no power interruption to the fuel system power supply 26 when the power is restored at R.

While the best mode for carrying out the invention has been described in detail, those familiar with the art to which this invention relates will recognize various alternative designs and embodiments for practicing the invention as defined by the following claims.

What is claimed:

1. A method of discriminating between a normal power interruption to a restraint control module and a collision induced power interruption to the restraint control module comprising:

setting a digital input bit of a microprocessor in a first state when a normal power interruption occurs;

monitoring by the microprocessor for power interruption to the restraint control module while powered;

monitoring an algorithm programmed into the microprocessor that checks sensor output data to determine whether a collision event has occurred, and upon determination that a power interruption has occurred checking the algorithm to determine whether the power interruption occurred during a collision event, setting the digital input bit to a second state to indicate that the power interruption occurred during a collision event, and preventing powering up of a system of the vehicle controlled by the microprocessor when the digital bit is in the second state.

2. The method of claim 1 wherein the system that is prevented from powering up is the fuel pump.

3. The method of claim 1 wherein the sensors provide data to the microprocessor relating to crash severity/safing.

4. The method of claim 1 wherein the restraint control module controls at least one air bag inflation system.

5. The method of claim 1 wherein the algorithm has collision profile data that is stored in memory and compared to the sensor output data to determine if a collision event has occurred.

6. A combined restraint control and fuel system cutoff control module for a vehicle, comprising:
- a restraint control module connected to a power supply when an ignition switch of the vehicle is in its on position and start position, the restraint control module having a microprocessor that is programmed with an algorithm that is used to detect a collision event;
- at least one sensor that provides acceleration/deceleration data to the microprocessor;
- the microprocessor controlling deployment of restraints and fuel system cutoff based upon analysis by the algorithm of acceleration/deceleration data received by the microprocessor, the microprocessor monitoring whether the connection of the restraint control module to the power supply is interrupted and whereupon the microprocessor further determines whether the interruption occurred during a collision even or is a normal power interruption, if it is determined that the interruption occurred during a collision event, the microprocessor enables the fuel system cutoff until the ignition switch is manipulated by an operator to reset the fuel system cutoff.

7. The combined restraint control and fuel system cutoff control module of claim 6 wherein the algorithm has sensor output profiles to which acceleration/deceleration data from at least one sensor is compared to detect the collision event.

8. The combined restraint control and fuel system cutoff control module of claim 6 wherein power interruptions that are of short duration occurring during a collision event are detected and cause the fuel system cutoff to prevent operation of the fuel system until the ignition is normally turned off and then to its on or start position.

9. The combined restraint control and fuel system cutoff control module of claim 6 wherein at least one sensor provides data to the microprocessor relating to crash severity/safing.

10. The combined restraint control and fuel system cutoff control module of claim 6 wherein the microprocessor is linked to a memory storage apparatus that stores acceleration/deceleration data when a collision event occurs for subsequent analysis until the ignition switch is cycled off and on.

11. The combined restraint control and fuel system cutoff control module of claim 10 wherein the system has a backup power supply for powering the restraint control and memory storage apparatus, the backup power supply being enabled when the vehicle power supply is interrupted.

12. The combined restraint control and fuel system cutoff control module of claim 6 wherein the restraint control module controls at least one air bag inflation system.

* * * * *